W. I. WHITEHURST.
NOODLE CUTTER.
APPLICATION FILED OCT. 25, 1907.
900,808.
Patented Oct. 13, 1908.
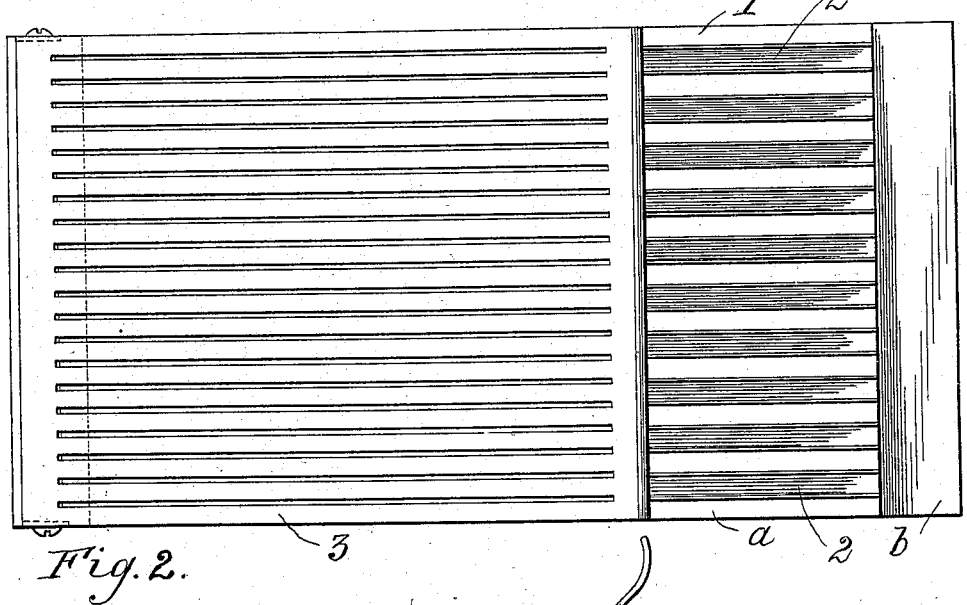
Fig. 2.
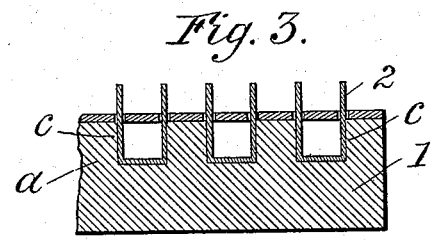
Fig. 3.
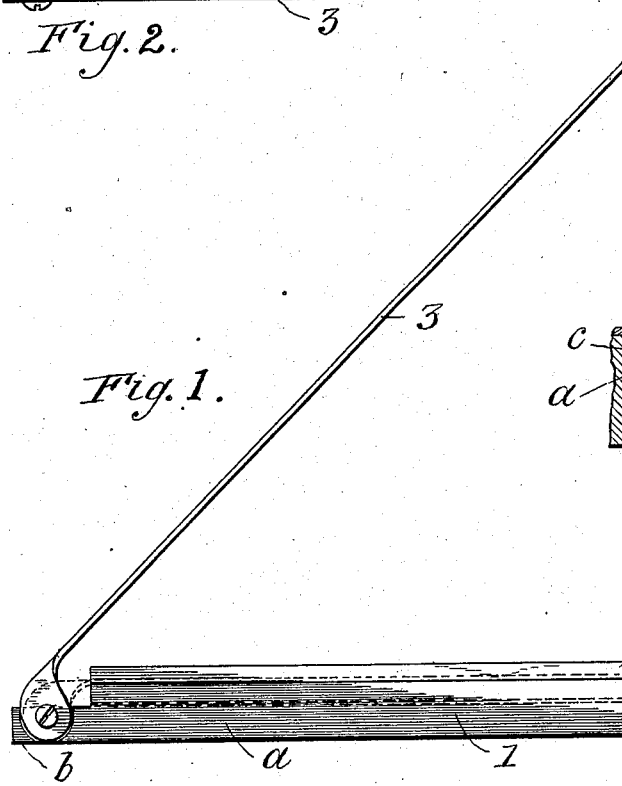
Fig. 1.
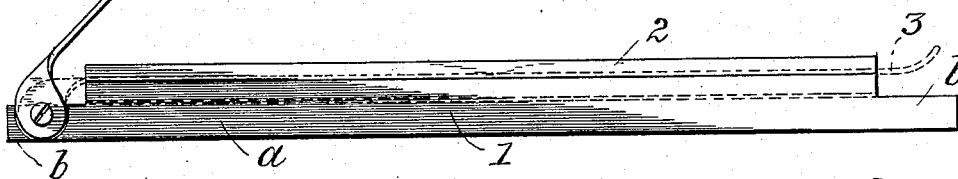
Witnesses
Frank B. Wooden.
Alberta C. Richards.
Inventor
Walter I. Whitehurst,
By G. H. & W. T. Howard,
Attorneys.

UNITED STATES PATENT OFFICE.

WALTER I. WHITEHURST, OF BALTIMORE, MARYLAND, ASSIGNOR TO KESTON MANUFACTURING COMPANY OF BALTIMORE CITY, OF BALTIMORE, MARYLAND, A CORPORATION OF MARYLAND.

NOODLE-CUTTER.

No. 900,808.　　　　Specification of Letters Patent.　　　　Patented Oct. 13, 1908.

Application filed October 25, 1907. Serial No. 399,098.

*To all whom it may concern:*

Be it known that I, WALTER I. WHITEHURST, of the city of Baltimore and State of Maryland, have invented certain Improvements in Noodle-Cutters, of which the following is a specification.

This invention relates to an improved device for cutting noodles from a thin sheet of dough; and it consists in a cutter provided with an appliance whereby the newly cut noodles may be collectively lifted from the cutter, as will hereinafter fully appear.

In the further description of the said invention which follows, reference is made to the accompanying drawing forming a part hereof and in which, Figure 1 is an exterior side view of the improved cutter with the noodle lifting appliance shown as raised from the cutting devices. Fig. 2 is a plan of Fig. 1, and Fig. 3 an enlarged cross section of a part of the cutter.

Referring now to the drawing, 1 is a board having its central part $a$ of considerably greater thickness than the ends $b$. The part $a$ is provided with a multiplicity of longitudinally extending grooves $c$ into each of which is forced a metallic strip 2 of U shaped cross section; and the strips project above the surface of the part $a$ of the board, as shown particularly in Fig. 3.

3 is a metallic plate hinged to one end of the board, and slotted so as to fit loosely over the U shaped strips, as shown by its dotted delineation in Fig. 1.

To prepare the cutter for use, the hinged slotted plate 3 is folded down as shown by the dotted lines in Fig. 1, and the full lines in Fig. 3. A sheet of dough is then rolled out to the required thickness, and then placed upon the cutting strips. The sheet of dough is then rolled with a rolling pin, which forces the dough into the spaces formed by the U shaped strips and the spaces between them. The surplus dough, or that extending beyond the cutting strips being cut away, the slotted plate 3 is lifted and thrown back, when the noodles lifted by the plate are deposited on any suitable receptacle placed at the hinged end of the board to receive them.

The object in making the cutting strips of U shaped cross section is to simplify the construction of the device, as to employ single flat strips would involve the cutting of double the number of grooves in the board.

I claim as my invention:—

In a noodle cutter a board provided with a multiplicity of grooves, with cutting strips of U shaped section, which are seated in the grooves and separated to a distance which is practically the same as the width of the strips, combined with a slotted plate which is hinged to the board and adapted to be folded over the cutting strips, substantially as specified.

WALTER I. WHITEHURST.

Witnesses:
　WM. T. HOWARD,
　THOMAS G. HULL.